United States Patent
Kimishima et al.

(10) Patent No.: US 10,837,514 B2
(45) Date of Patent: Nov. 17, 2020

(54) VALVE STRUCTURE OF SHOCK ABSORBER

(71) Applicant: KYB Corporation, Tokyo (JP)

(72) Inventors: Kazuyuki Kimishima, Gifu (JP); Hideki Yamada, Gifu (JP); Makoto Arano, Gifu (JP); Kenji Hibi, Gifu (JP); Koji Kawamura, Osaka (JP)

(73) Assignee: KYB CORPORATION, Tokyo (JP)

( * ) Notice: Subject to any disclaimer, the term of this patent is extended or adjusted under 35 U.S.C. 154(b) by 367 days.

(21) Appl. No.: 15/750,659

(22) PCT Filed: Aug. 2, 2016

(86) PCT No.: PCT/JP2016/072699
§ 371 (c)(1),
(2) Date: Feb. 6, 2018

(87) PCT Pub. No.: WO2017/026332
PCT Pub. Date: Feb. 16, 2017

(65) Prior Publication Data
US 2020/0088261 A1    Mar. 19, 2020

(30) Foreign Application Priority Data

Aug. 7, 2015 (JP) ................................. 2015-157518

(51) Int. Cl.
*F16F 9/348* (2006.01)
*F16F 9/512* (2006.01)
(Continued)

(52) U.S. Cl.
CPC .......... *F16F 9/3484* (2013.01); *F16F 9/5126* (2013.01); *B60G 13/08* (2013.01);
(Continued)

(58) Field of Classification Search
CPC ...... F16F 9/3484; F16F 9/5126; F16F 9/3485; F16F 9/3488; F16F 9/3214; B60G 13/08; B60G 2202/24; B60G 2206/41
(Continued)

(56) References Cited

U.S. PATENT DOCUMENTS 4,111,231 A * 9/1978 Leppich ................ F16F 9/3484
                                                  137/852
4,485,900 A   12/1984 Kato et al.
(Continued)

FOREIGN PATENT DOCUMENTS

GB    2437185 A    10/2007
JP    H01-135935 A    5/1989
(Continued)

*Primary Examiner* — Pamela Rodriguez
(74) *Attorney, Agent, or Firm* — Rabin & Berdo, P.C.

(57) ABSTRACT

A valve structure of a shock absorber includes a piston to which a first communication passage and a second communication passage are provided, and a load application member that applies an initial load to a first leaf valve. The initial load is applied to the first leaf valve within a range between the inside in the radial direction from a first seat part and the outside in the radial direction from an abutting part of the piston, the first seat part being positioned on the outside in the radial direction of the first communication passage.

10 Claims, 5 Drawing Sheets

(51) Int. Cl.
 *B60G 13/08* (2006.01)
 *F16F 9/32* (2006.01)
(52) U.S. Cl.
 CPC ...... *B60G 2202/24* (2013.01); *B60G 2206/41* (2013.01); *F16F 9/3214* (2013.01); *F16F 9/3485* (2013.01); *F16F 9/3488* (2013.01)
(58) Field of Classification Search
 USPC ... 188/322.15, 322.13, 322.22, 282.5, 282.4, 188/317
 See application file for complete search history.

(56) References Cited

U.S. PATENT DOCUMENTS

| | | | | |
|---|---|---|---|---|
| 6,116,388 | A * | 9/2000 | Bataille | F16F 9/348 188/282.5 |
| 6,276,499 | B1 * | 8/2001 | Satou | F16F 9/3484 188/282.5 |
| 9,194,455 | B2 * | 11/2015 | Ashiba | F16F 9/3484 |
| 9,285,008 | B2 * | 3/2016 | Yamada | F16F 9/3214 |
| 2009/0294232 | A1 * | 12/2009 | Ashiba | F16F 9/348 188/322.15 |
| 2014/0150897 | A1 | 6/2014 | Ashiba | |
| 2015/0211634 | A1 * | 7/2015 | Kobayashi | F16J 1/04 92/172 |

FOREIGN PATENT DOCUMENTS

| | | |
|---|---|---|
| JP | 2006-194336 A | 7/2006 |
| JP | 2014-129865 A | 7/2014 |
| JP | 2015-90180 A | 5/2015 |
| WO | WO 2009-149331 A2 | 12/2009 |

\* cited by examiner

VALVE STRUCTURE OF SHOCK ABSORBER

TECHNICAL FIELD

The present invention relates to a valve structure of a shock absorber.

BACKGROUND ART

JP2015-90180A discloses a shock absorber including the following: a piston that partitions the inside of a cylinder into two chambers; a passage that is formed in the piston and allows communication between the two chambers; and a damping valve provided to the piston. The damping valve is constituted by a plurality of leaf valves, and generates a damping force by applying resistance to hydraulic oil that flows through the passage.

The damping force characteristics of the shock absorber disclosed in JP2015-90180A are modified by changing the deflection force of the leaf valves.

However, in the shock absorber disclosed in JP2015-90180A, the range over which the damping force characteristics can be modified is limited to a piston speed range from when the leaf valves begin to open until the leaf valves are fully opened. Therefore, it is difficult to modify the damping force characteristics over a wider range of piston speeds.

An object of the present invention is to provide a valve structure of a shock absorber which enables the damping force characteristics to be modified over a wide range.

According to one aspect of the present invention, a valve structure of a shock absorber includes: a valve disc provided within a cylinder and configured to partition a first pressure chamber and a second pressure chamber; a first communication passage provided to the valve disc and configured to allow communication between the first pressure chamber and the second pressure chamber; a second communication passage provided to the valve disc on the inside in the radial direction from the first communication passage, the second communication passage being configured to allow communication between the first pressure chamber and the second pressure chamber; a first seat part provided around the periphery of an opening edge of the first communication passage on the first pressure chamber side; a second seat part provided around the periphery of an opening edge of the second communication passage on the first pressure chamber side; an annular first plate valve configured to abut the first seat part and the second seat part; and a load application member configured to apply an initial load that pushes the first plate valve to the first seat part and the second seat part. The valve disc includes an abutting part to which an inner peripheral edge of the first plate valve abuts. The initial load is applied to the first plate valve within a range between the inside in the radial direction from the first seat part and the outside in the radial direction from the abutting part, the first seat part being positioned on the outside in the radial direction of the first communication passage.

DESCRIPTION OF EMBODIMENTS

Figure 1:
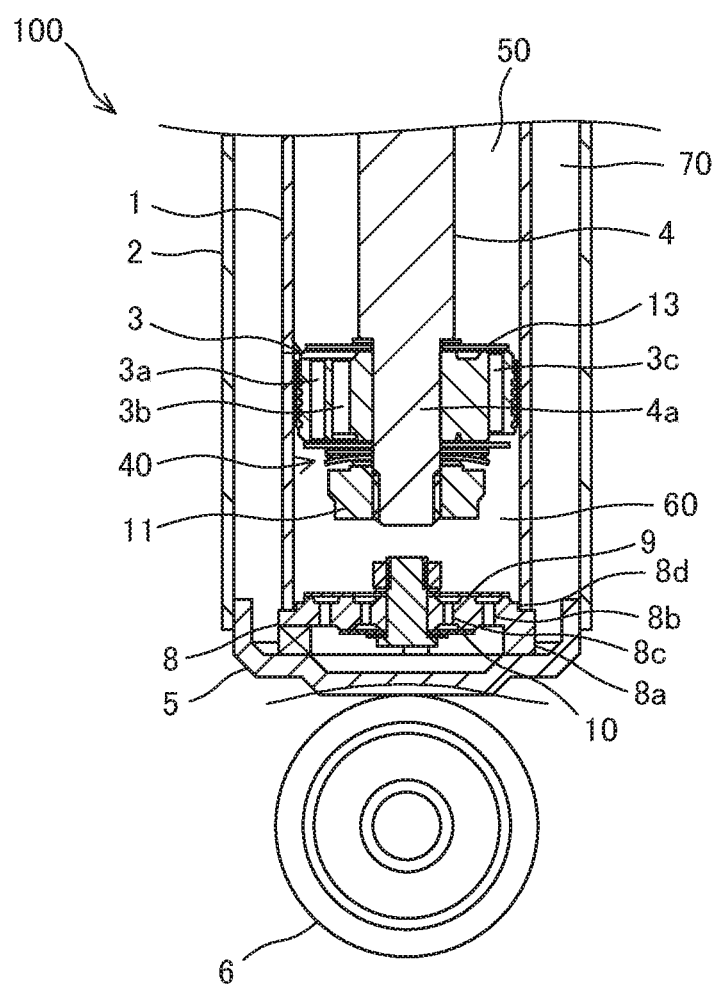
FIG. 1 is a partial cross-section view of a shock absorber according to an embodiment of the present invention.

An embodiment of the present invention will now be explained below referring to the drawings.

Figure 2:
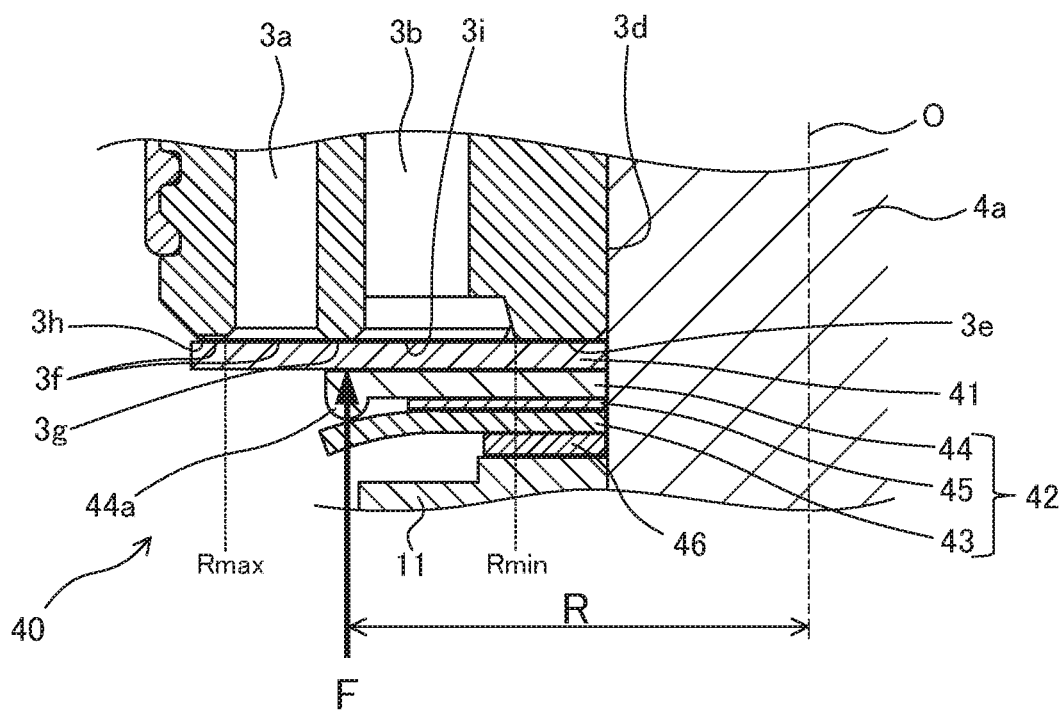
FIG. 2 illustrates an enlarged cross-section view of a valve structure of the shock absorber according to the embodiment of the present invention.
Figure 3:
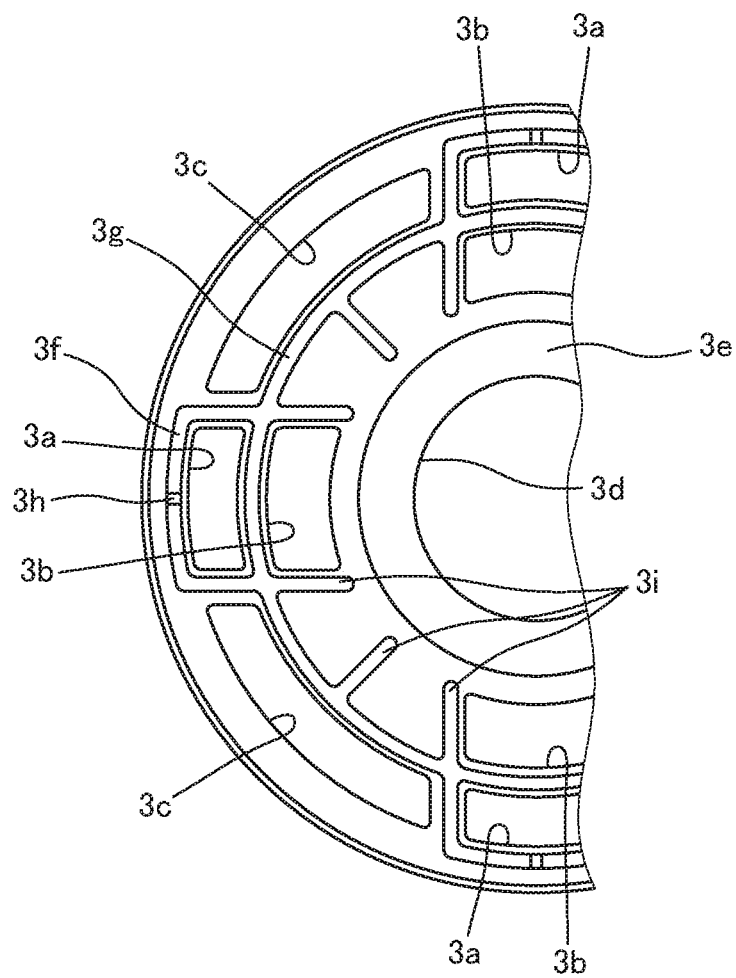
FIG. 3 is a plan view of a piston of the shock absorber according to the embodiment of the present invention.

Referring to FIGS. 1 to 3, a valve structure of a shock absorber 100 according to the embodiment of the present invention will now be explained.

The shock absorber 100 is, for example, a device that is interposed between the vehicle body and the axle of an automobile (not illustrated), and generates a damping force to suppress vibrations of the vehicle body.

As shown in FIG. 1, the shock absorber 100 includes the following: an inner tube 1 serving as a cylinder that is filled with hydraulic oil serving as a working liquid; an outer tube 2 that is disposed so as to cover the inner tube 1; a piston 3 serving as a valve disc that is slidably inserted into the inner tube 1; and a piston rod 4 that is connected to the piston 3 and inserted into the inner tube 1 such that the piston rod 4 can move into and out of the inner tube 1.

The inside of the inner tube 1 is partitioned by the piston 3 into a contraction-side chamber 60 serving as a first pressure chamber and an extension-side chamber 50 serving as a second pressure chamber. A reservoir 70 that stores hydraulic oil is formed between the inner tube 1 and the outer tube 2. In addition to storing the hydraulic oil, a compressed gas for preventing cavitation of the hydraulic oil, etc. is also sealed in the reservoir 70.

The end of the outer tube 2 on the contraction-side chamber 60 side, which is the bottom side of the outer tube 2, is closed by a bottom member 5. The bottom member 5 is fixed by welding to the outer tube 2. A connection member 6 for attaching the shock absorber 100 to a vehicle is provided to the bottom member 5.

A rod guide (not illustrated) that slidably supports the piston rod 4 and an oil seal (not illustrated) for preventing the hydraulic oil and the compressed gas from leaking to the outside of the shock absorber 100 are provided to the end of the inner tube 1 on the extension-side chamber 50 side. A base valve 8 that partitions the contraction-side chamber 60 and the reservoir 70 is provided to the end of the inner tube 1 on the contraction-side chamber 60 side, which is the bottom side of the inner tube 1.

The base valve 8 includes: a plurality of legs 8a that are formed on the outer peripheral side of the surface on the bottom member 5 side and that abut the bottom member 5; passages 8b, 8c that allow communication between the contraction-side chamber 60 and the reservoir 70; and a press-fitting part 8d formed on the outer peripheral side. The base valve 8 is fixed by press-fitting the press-fitting part 8d into the inner tube 1 and sandwiching the legs 8a between the end surface of the inner tube 1 on the contraction-side chamber 60 side and the bottom member 5.

A check valve 9 is disposed on the contraction-side chamber 60 side of the base valve 8, and a damping valve 10 is disposed on the reservoir 70 side of the base valve 8.

The check valve 9 is opened by the pressure difference between the contraction-side chamber 60 and the reservoir 70 during extension of the shock absorber 100, thereby opening the passage 8b. The check valve 9 closes the passage 8b during contraction of the shock absorber 100.

The damping valve 10 is opened by the pressure difference between the contraction-side chamber 60 and the reservoir 70 during contraction of the shock absorber 100, thereby opening the passage 8c. Further, the damping valve 10 applies resistance to the flow of hydraulic oil flowing from the contraction-side chamber 60 to the reservoir 70 via the passage 8c. The damping valve 10 closes the passage 8c during extension of the shock absorber 100.

A small-diameter part 4a, which is smaller in diameter than the outer diameter of the piston rod 4 and is inserted into the piston 3, is formed on the end of the piston rod 4 on the piston 3 side. Male threads are formed on the small-diameter part 4a, and the piston rod 4 and the piston 3 are connected by screwing a nut 11 onto the small-diameter part 4a.

The piston 3 has a first communication passage 3a, a second communication passage 3b, and a third communication passage 3c that allow communication between the extension-side chamber 50 and the contraction-side chamber 60. A check valve 13 is disposed on the extension-side chamber 50 side of the piston 3, and a damping valve 40 is disposed on the contraction-side chamber 60 side of the piston 3. In the present embodiment, the valve structure is constituted by the piston 3 and the damping valve 40.

The check valve 13 is an annular leaf valve, and the inner peripheral edge of the check valve 13 is sandwiched between the piston 3 and the piston rod 4 as a fixed end and the outer peripheral edge of the check valve 13 elastically deforms as a free end. The check valve 13 is opened by the pressure difference between the extension-side chamber 50 and the contraction-side chamber 60 during contraction of the shock absorber 100, thereby opening the third communication passage 3c. The check valve 13 closes the third communication passage 3c during extension of the shock absorber 100.

As shown in FIG. 2, the damping valve 40 includes a first leaf valve 41 that serves as a first plate valve and is disposed abutting the piston 3, and a load application member 42 that applies, to the first leaf valve 41, an initial load F acting in a direction to push the first leaf valve 41 to the piston 3.

The first leaf valve 41 is annular, and the inner peripheral edge of the first leaf valve 41 is sandwiched between the piston 3 and the nut 11 as a fixed end and the outer peripheral edge of the first leaf valve 41 elastically deforms as a free end.

The load application member 42 includes the following: an annular second leaf valve 43 that serves as a second plate valve; an annular transmission plate 44 that is sandwiched between the first leaf valve 41 and the second leaf valve 43, and that transmits an elastic force of the second leaf valve 43 to the first leaf valve 41; and an annular spacer 45 that is sandwiched between the inner peripheral edge of the second leaf valve 43 and the inner peripheral edge of the transmission plate 44.

A protrusion 44a, which causes the outer peripheral edge of the second leaf valve 43 to elastically deform, is formed on the outer peripheral edge of the transmission plate 44 so as to protrude toward the outer peripheral edge of the second leave valve 43. A load that is generated when the outer peripheral edge of the second leaf valve 43 elastically deforms acts as the initial load F on the first leaf valve 41 via the protrusion 44a of the transmission plate 44. In this way, the load application member 42 presses the first leaf valve 41 toward the piston 3.

The magnitude of the initial load F that is applied by the load application member 42 is changed by modifying the rigidity of the second leaf valve 43 or the deformation amount of the outer peripheral edge of the second leaf valve 43. In particular, the deformation amount of the outer peripheral edge of the second leaf valve 43 is changed by modifying the thickness of the spacer 45, and thus the magnitude of the initial load F can be easily adjusted by simply exchanging the spacer 45. The method for adjusting the magnitude of the initial load F is not limited to that described above, and the magnitude of the initial load F may also be adjusted by modifying the protrusion amount of the protrusion 44a of the transmission plate 44 so as to modify the deformation amount of the outer peripheral edge of the second leaf valve 43.

The position on the first leaf valve 41 at which the initial load F is applied can be changed by modifying the outer diameter of the transmission plate 44 and the second leaf valve 43.

The protrusion 44a may be provided continuously in the peripheral direction, or may be provided intermittently. The protrusion 44a may also be formed to protrude toward the first leaf valve 41 instead of the second leaf valve 43. The cross-section shape of the protrusion 44a is not limited to a hemispherical shape, and the protrusion 44a may have any cross-section shape as long as it can cause the outer peripheral edge of the second leaf valve 43 to elastically deform. The protrusion 44a may also be formed as a separate member from the transmission plate 44, such as a ring-shaped member that is sandwiched between the transmission plate 44 and the second leaf valve 43.

In the damping valve 40 configured as described above, the following are laminated in order from the piston 3 side: the first leaf valve 41, the transmission plate 44, the spacer 45, and the second leaf valve 43. In the laminated state, the inner peripheral edges of these members are sandwiched between the nut 11 and the piston 3 via a washer 46. In this way, the damping valve 40 is fixed to the piston 3.

The damping valve 40 is opened by the pressure difference between the extension-side chamber 50 and the contraction-side chamber 60 during extension of the shock absorber 100, thereby opening the first communication passage 3a and the second communication passage 3b, and the damping valve 40 applies resistance to the flow of hydraulic oil flowing from the extension-side chamber 50 to the contraction-side chamber 60 via the first communication passage 3a and the second communication passage 3b. The damping valve 40 closes the first communication passage 3a and the second communication passage 3b during contraction of the shock absorber 100. The concrete operation of the damping valve 40 will be explained later.

Next, referring to FIGS. 2 and 3, the structure of the piston 3 on the side at which the damping valve 40 is provided will be explained. FIG. 3 is a plan view of the piston 3 when viewed from the contraction-side chamber 60 side.

The piston 3 is an annular member having a through-hole 3d, through which the small-diameter part 4a of the piston rod 4 penetrates, formed in the center thereof. The first communication passage 3a and the third communication passage 3c are provided alternately in the circumferential direction at portions toward the outer periphery of the piston 3. The second communication passage 3b is provided on the inside in the radial direction of the first communication passage 3a. These communication passages 3a, 3b, and 3c are formed to penetrate through the piston 3 in the axial direction.

A flat-shaped abutting part 3e which is abutted by the inner peripheral edge of the first leaf valve 41 is provided between the through-hole 3d and the second communication passage 3b. Further, a first seat part 3f and a second seat part 3g which are abutted by the first leaf valve 41 are provided respectively around the periphery of the opening edge of the first communication passage 3a and around the periphery of the opening edge of the second communication passage 3b.

The first seat part 3f is formed so as to surround the opening edge of the first communication passage 3a, and the portion between the opening edge of the first communication passage 3a and the opening edge of the second communication passage 3b forms a common seat part with the second seat part 3g. A notch 3h is provided to the first seat part 3f that is provided on the outside in the radial direction of the first communication passage 3a. The notch 3h functions as an orifice, and allows communication between the extension-side chamber 50 and the contraction-side chamber 60 via the first communication passage 3a even when the first leaf valve 41 is abutting the first seat part 3f.

The second seat part 3g is provided on the outside in the radial direction of the second communication passage 3b and is formed in an annular shape centered on the axial center of the piston 3. All of the second communication passages 3b are closed when the first leaf valve 41, the inner peripheral edge of which abuts the abutting part 3e, abuts the second seat part 3g.

Support parts 3i which support the first leaf valve 41 are provided to the piston 3 between the second seat part 3g and the abutting part 3e. The support parts 3i are constituted by a plurality of ribs that extend radially inward from the second seat part 3g. The surface at which the support parts 3i contact the first leaf valve 41 is provided to be on the same plane as the surface at which the first seat part 3f, the second seat part 3g and the abutting part 3e contact the first leaf valve 41. By providing the support parts 3i, the first leaf valve 41 is prevented from deforming toward the piston 3 between the second seat part 3g and the abutting part 3e.

Herein, the valve-opening pressure of an annular leaf valve is generally determined by the rigidity thereof, and decreases toward the free end. In the damping valve 40 provided to the piston 3 configured as described above, as shown in FIG. 2, the initial load F is applied to the first leaf valve 41 at a position separated from the axial center O of the piston rod 4 by a predetermined distance (radius R). Therefore, the valve-opening pressure of the first leaf valve 41 increases more toward the inside in the radial direction from the position at which the initial load F is applied according to the magnitude of the initial load F. In other words, the valve-opening pressure of the first leaf valve 41 can be made to differ on the inside in the radial direction from the position at which the initial load F is applied and on the outside in the radial direction from the position at which the initial load F is applied.

If the position at which the initial load F is applied is on the first seat part 3f which is positioned on the outside in the radial direction of the first communication passage 3a, the valve-opening pressure of the entire first leaf valve 41 increases according to the magnitude of the initial load F. Therefore, the valve-opening pressure of the first leaf valve 41 cannot be made to differ on the inside in the radial direction and on the outside in the radial direction from the position at which the initial load F is applied. Further, if the position at which the initial load F is applied is on the abutting part 3e, the valve-opening pressure of the first leaf valve 41 does not change. Therefore, the position at which the initial load F is applied is set within a range between the inside in the radial direction from the first seat part 3f, which is positioned on the outside in the radial direction of the first communication passage 3a, and the outside in the radial direction from the abutting part 3e.

In other words, if the position at which the initial load F is applied is modified within a range from the maximum radius Rmax to the minimum radius Rmin shown in FIG. 2, the valve-opening pressure of the first leaf valve 41 can be made to differ on the inside in the radial direction and on the outside in the radial direction from the position at which the initial load F is applied.

Figure 4:
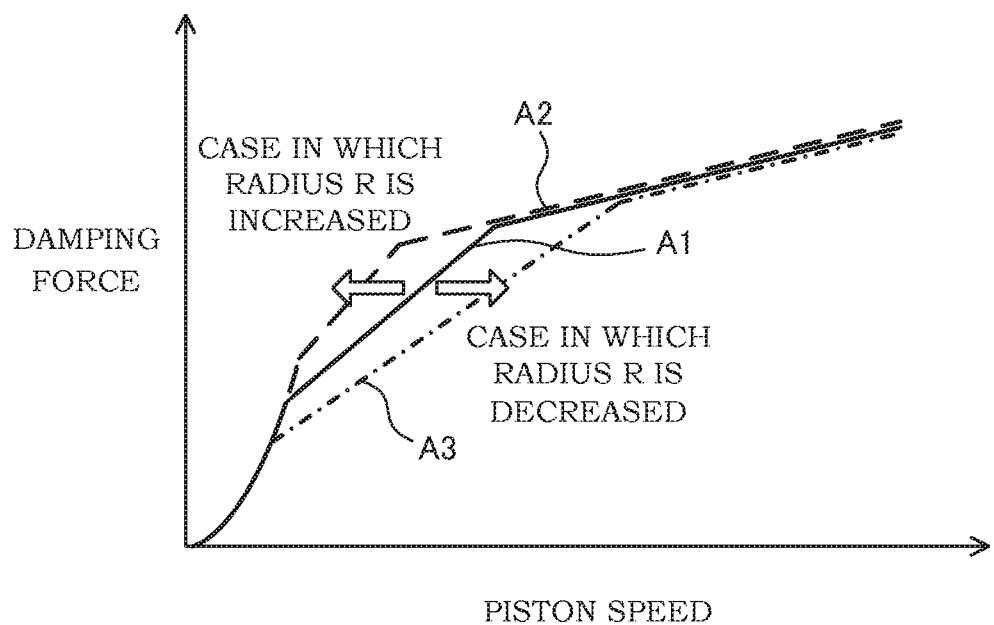
FIG. 4 is a graph illustrating the damping force characteristics of the shock absorber according to the embodiment of the present invention.
Figure 5:
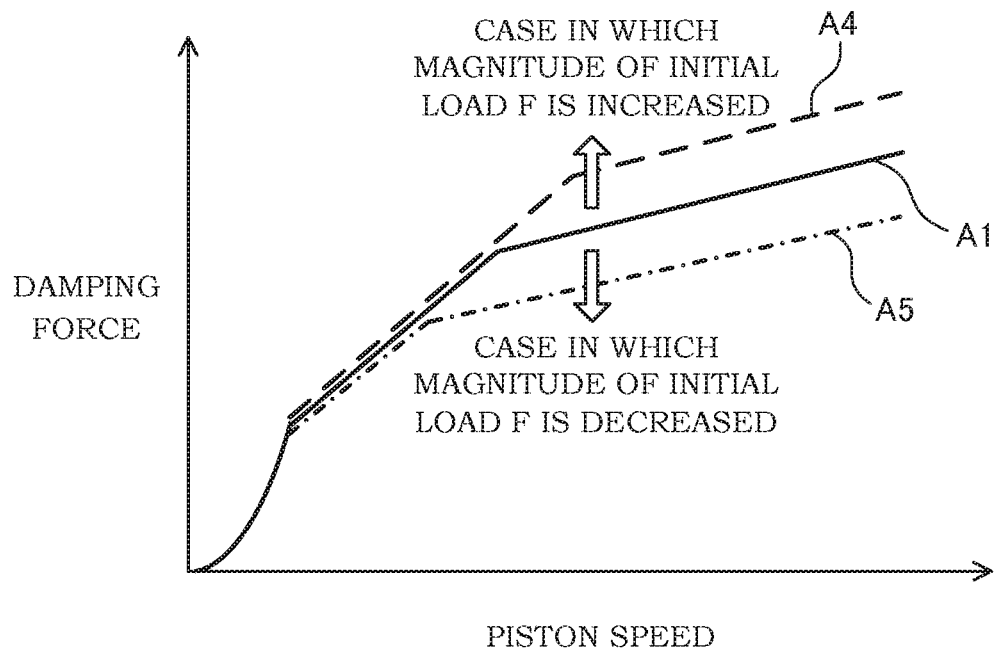
FIG. 5 is a graph illustrating the damping force characteristics of the shock absorber according to the embodiment of the present invention.

Next, referring to FIGS. 2, 4, and 5, the operation of the damping valve 40 will be explained. FIG. 4 is a graph illustrating changes in the damping force characteristics when the position (radius R) at which the initial load F is applied is changed, and FIG. 5 is a graph illustrating changes in the damping force characteristics when the magnitude of the initial load F is changed.

The damping valve 40 changes the damping force of the shock absorber 100 by changing the opening degree of the first communication passage 3a and the second communication passage 3b according to the movement speed of the piston 3 during extension of the shock absorber 100 in which the piston rod 4 moves out of the inner tube 1.

First, as shown in FIG. 2, a case in which the position at which the initial load F is applied is near the second seat part 3g (hereinafter referred to as the First Embodiment A1) will be explained.

While the movement speed of the piston 3 is relatively low, the pressing force of the hydraulic oil that acts on the first leaf valve 41 is low, and thus the first leaf valve 41 is maintained in a state in which it is seated on the first seat part 3f and the second seat part 3g. Therefore, the hydraulic oil flows from the extension-side chamber 50 to the contraction-side chamber 60 via the notch 3h. The notch 3h functions as an orifice, and thus the damping force during this period exhibits square-law characteristics in which the damping force changes proportional to the square of the piston speed.

If the movement speed of the piston 3 increases and the pressure of the hydraulic oil reaches the valve-opening pressure of the first leaf valve 41 on the outside in the radial direction from the position at which the initial load F is applied, the outer peripheral edge of the first leaf valve 41 deflects, and the first leaf valve 41 separates from the first seat part 3f. Therefore, the hydraulic oil flows from the extension-side chamber 50 to the contraction-side chamber 60 via a gap between the outer peripheral edge of the first leaf valve 41 and the first seat part 3f. This gap increases as the pressure of the hydraulic oil increases, i.e. as the piston speed increases. Thus, the damping force of the shock absorber 100 changes approximately proportional to the piston speed.

If the movement speed of the piston 3 increases further and the pressure of the hydraulic oil reaches the valve-opening pressure of the first leaf valve 41 on the inside in the radial direction from the position at which the initial load F is applied, the first leaf valve 41 separates from the second seat part 3g. Therefore, the hydraulic oil flows from the extension-side chamber 50 to the contraction-side chamber 60 via the first communication passage 3a, which has already been opened, as well as a gap between the first leaf valve 41 and the second seat part 3g. In this way, since the surface area of the passages that allow communication between the extension-side chamber 50 and the contraction-side chamber 60 increases together with an increase in the piston speed, the damping force of the shock absorber 100 increases gradually.

The first communication passage 3a and the second communication passage 3b that are closed by the first leaf valve 41 are formed independently of each other, and thus the damping force after the first leaf valve 41 is opened changes in two stages as indicated by the solid line in FIG. 4. Therefore, sudden changes in the damping force relative to the piston speed can be suppressed, and the riding comfort of the vehicle can be improved.

Next, a case in which the position at which the initial load F is applied is closer to the maximum radius Rmax which is on the outside in the radial direction from the second seat part 3g (hereinafter referred to as the Second Embodiment A2) will be explained.

While the movement speed of the piston 3 is relatively low, the hydraulic oil flows from the extension-side chamber 50 to the contraction-side chamber 60 via the notch 3h similar to the First Embodiment A1. Thus, an explanation thereof will be omitted.

If the movement speed of the piston 3 increases and the pressure of the hydraulic oil reaches the valve-opening pressure of the first leaf valve 41 on the outside in the radial direction from the position at which the initial load F is applied, the outer peripheral edge of the first leaf valve 41 deflects, and the first leaf valve 41 separates from the first seat part 3f. Herein, in the Second Embodiment A2, the position at which the initial load F is applied, i.e. the position which serves as a fulcrum of the deflection of the outer peripheral edge of the first leaf valve 41, is more toward the outside in the radial direction compared to the First Embodiment A1. Therefore, the range in which the outer peripheral edge of the first leaf valve 41 can deflect in the axial direction is smaller compared to the First Embodiment A1, and the gap between the outer peripheral edge of the first leaf valve 41 and the first seat part 3f is smaller than that in the First Embodiment A1. Accordingly, as indicated by the dashed line in FIG. 4, the damping force of the Second Embodiment A2 becomes larger than the damping force of the First Embodiment A1.

If the movement speed of the piston 3 increases further and the pressure of the hydraulic oil reaches the valve-opening pressure of the first leaf valve 41 on the inside in the radial direction from the position at which the initial load F is applied, the first leaf valve 41 opens the first communication passage 3a and also separates from the second seat part 3g. Therefore, the hydraulic oil flows from the extension-side chamber 50 to the contraction-side chamber 60 via the first communication passage 3a as well as a gap between the first leaf valve 41 and the second seat part 3g. As a result, the damping force of the Second Embodiment A2 increases gradually approximately proportional to the piston speed as in the First Embodiment A1.

Next, a case in which the position at which the initial load F is applied is closer to the minimum radius Rmin which is on the inside in the radial direction from the second seat part 3g (hereinafter referred to as the Third Embodiment A3) will be explained.

While the movement speed of the piston 3 is relatively low, the hydraulic oil flows from the extension-side chamber 50 to the contraction-side chamber 60 via the notch 3h similar to the First Embodiment A1. Thus, an explanation thereof will be omitted.

If the movement speed of the piston 3 increases and the pressure of the hydraulic oil reaches the valve-opening pressure of the first leaf valve 41 on the outside in the radial direction from the position at which the initial load F is applied, the outer peripheral edge of the first leaf valve 41 deflects. Herein, in the Third Embodiment A3, the position at which the initial load F is applied, i.e. the position which serves as a fulcrum of the deflection of the outer peripheral edge of the first leaf valve 41, is more toward the inside in the radial direction compared to the First Embodiment A1.

Therefore, if the pressure of the hydraulic oil, i.e. the piston speed, increases, the first leaf valve 41 separates from the first seat part 3f and also separates from the second seat part 3g. In this way, the gap through which the hydraulic oil can flow is larger than that in the First Embodiment A1. Accordingly, as indicated by the dash-dot line in FIG. 4, the damping force of the Third Embodiment A3 becomes smaller than the damping force of the First Embodiment A1.

If the movement speed of the piston 3 increases further and the pressure of the hydraulic oil reaches the valve-opening pressure of the first leaf valve 41 on the inside in the radial direction from the position at which the initial load F is applied, the first leaf valve 41 further opens the second communication passage 3b. Therefore, the hydraulic oil flows from the extension-side chamber 50 to the contraction-side chamber 60 via the first communication passage 3a as well as the second communication passage 3b which has been opened. As a result, the damping force of the Third Embodiment A3 increases gradually approximately proportional to the piston speed as in the First Embodiment A1.

In the case that the position at which the initial load F is applied is set to be more toward the inside in the radial direction than the second seat part 3g, the first leaf valve 41 is deformed to the piston 3 side by the initial load F between the second seat part 3g and the abutting part 3e, and thus the outer peripheral edge of the first leaf valve 41 may float up from the first seat part 3f. In the present embodiment, the support parts 3i are provided to the piston 3 between the second seat part 3g and the abutting part 3e. The first leaf valve 41 is supported by the support parts 3i, and thus even if the initial load F is applied, the first leaf valve 41 is prevented from deforming to the piston 3 side. As a result, the outer peripheral edge of the first leaf valve 41 is prevented from floating up from the first seat part 3f and the range in which the initial load F can be applied is broadened, and thus the desired damping force characteristics can be obtained.

In this way, by changing the radius R which is the position at which the initial load F is applied to the first leaf valve 41, the damping force characteristics can be changed particularly in an intermediate speed region on the low-speed side as shown in FIG. 4. Specifically, the damping force increases as the radius R is increased, and the damping force decreases as the radius R is decreased.

Next, a case in which the magnitude of the initial load F is increased compared to the First Embodiment A1 (hereinafter referred to as the Fourth Embodiment A4) will be explained.

While the movement speed of the piston 3 is relatively low, the hydraulic oil flows from the extension-side chamber 50 to the contraction-side chamber 60 via the notch 3h similar to the First Embodiment A1. Thus, an explanation thereof will be omitted.

If the movement speed of the piston 3 increases and the pressure of the hydraulic oil reaches the valve-opening pressure of the first leaf valve 41 on the outside in the radial direction from the position at which the initial load F is applied, the outer peripheral edge of the first leaf valve 41 deflects and the first leaf valve 41 separates from the first seat part 3f. In the Fourth Embodiment A4, the position at which the initial load F is applied, i.e. the position which serves as a fulcrum of the deflection of the outer peripheral edge of the first leaf valve 41, is the same as in the First Embodiment A1. Therefore, the damping force of the Fourth Embodiment A4 increases approximately proportional to the piston speed similar to the First Embodiment A1.

If the movement speed of the piston 3 increases further and the pressure of the hydraulic oil reaches the valve-opening pressure of the first leaf valve 41 on the inside in the radial direction from the position at which the initial load F is applied, the first leaf valve 41 opens the second communication passage 3b. Herein, since the initial load F of the Fourth Embodiment A4 is larger than that of the First Embodiment A1, the valve-opening pressure of the first leaf valve 41 on the inside in the radial direction from the position at which the initial load F is applied is larger than that of the First Embodiment A1. Therefore, as indicated by the dashed line in FIG. 5, the damping force of the Fourth Embodiment A4 surpasses the damping force of the First Embodiment A1 in the region in which the piston speed is high.

Next, a case in which the magnitude of the initial load F is decreased compared to the First Embodiment A1 (hereinafter referred to as the Fifth Embodiment A5) will be explained.

While the movement speed of the piston 3 is relatively low, the hydraulic oil flows from the extension-side chamber 50 to the contraction-side chamber 60 via the notch 3h similar to the First Embodiment A1. Thus, an explanation thereof will be omitted.

If the movement speed of the piston 3 increases and the pressure of the hydraulic oil reaches the valve-opening pressure of the first leaf valve 41 on the outside in the radial direction from the position at which the initial load F is applied, the outer peripheral edge of the first leaf valve 41 deflects and the first leaf valve 41 separates from the first seat part 3f. In the Fifth Embodiment A5, the position at which the initial load F is applied, i.e. the position which serves as a fulcrum of the deflection of the outer peripheral edge of the first leaf valve 41, is the same as in the First Embodiment A1. Therefore, the damping force of the Fifth Embodiment A5 increases approximately proportional to the piston speed similar to the First Embodiment A1.

If the movement speed of the piston 3 increases further and the pressure of the hydraulic oil reaches the valve-opening pressure of the first leaf valve 41 on the inside in the radial direction from the position at which the initial load F is applied, the first leaf valve 41 opens the second communication passage 3b. Herein, since the initial load F of the Fifth Embodiment A5 is smaller than that of the First Embodiment A1, the valve-opening pressure of the first leaf valve 41 on the inside in the radial direction from the position at which the initial load F is applied is smaller than that of the First Embodiment A1. Therefore, as indicated by the dash-dot line in FIG. 5, the damping force of the Fifth Embodiment A5 falls below the damping force of the First Embodiment A1 in the region in which the piston speed is high.

In this way, by changing the magnitude of the initial load F, the damping force characteristics can be changed particularly in the high-speed region as shown in FIG. 5. Specifically, the damping force increases as the magnitude of the initial load F is increased, and the damping force decreases as the magnitude of the initial load F is decreased.

As described above, according to the present embodiment, the damping force characteristics can be changed in a broad range of piston speeds by changing the radius R at which the initial load F acts and by changing the magnitude of the initial load F.

In general, if the damping force suddenly changes relative to the piston speed, the riding comfort of the vehicle may worsen. In the present embodiment, the first communication passage 3a and the second communication passage 3b, which are closed by the first leaf valve 41, are formed individually, and thus as shown in FIGS. 4 and 5, the damping force changes gradually according to the piston speed without any sudden changes. As a result, damping force characteristics which improve the riding comfort of the vehicle can be realized.

The configuration, operation, and effects of the above embodiment of the present invention will now be summarized below.

The valve structure of the shock absorber 100 includes the following: the piston 3 that is provided within the inner tube 1 and partitions the contraction-side chamber 60 and the extension-side chamber 50; the first communication passage 3a that is provided to the piston 3 and allows communication between the contraction-side chamber 60 and the extension-side chamber 50; the second communication passage 3b that is provided to the piston 3 more toward the inside in the radial direction than the first communication passage 3a, and allows communication between the contraction-side chamber 60 and the extension-side chamber 50; the first seat part 3f that is provided around the periphery of the opening edge of the first communication passage 3a on the contraction-side chamber 60 side; the second seat part 3g that is provided around the periphery of the opening edge of the second communication passage 3b on the contraction-side chamber 60 side; the annular first leaf valve 41 that abuts the first seat part 3f and the second seat part 3g; and the load application member 42 that applies the initial load F which pushes the first leaf valve 41 to the first seat part 3f and the second seat part 3g. The piston 3 includes the abutting part 3e which is abutted by the inner peripheral edge of the first leaf valve 41, and the initial load F is applied to the first leaf valve 41 within a range between the inside in the radial direction from the first seat part 3f, which is positioned on the outside in the radial direction of the first communication passage 3a, and the outside in the radial direction from the abutting part 3e.

According to this configuration, the load which causes the first leaf valve 41 to separate from the first seat part 3f and the second seat part 3g is changed by changing the position at which the initial load F is applied and by changing the magnitude of the initial load F. As a result, the damping force characteristics of the shock absorber 100 can be modified over a wide range of piston speeds. In particular, by changing the position at which the initial load F is applied, the damping force characteristics in the low to intermediate speed region can be modified, and by changing the magnitude of the initial load F, the damping force characteristics on the high-speed side can be modified.

Further, in this configuration, the passages which are closed by the first leaf valve 41 are formed individually, and thus the damping force changes gradually from the low-speed side to the high-speed side. In addition, by changing the position at which the initial load F is applied and by changing the magnitude of the initial load F, the damping force in the intermediate speed region can be adjusted so that the damping force on the low-speed side and the damping force on the high-speed side are smoothly connected. As a result, sudden changes in the damping force relative to the piston speed can be suppressed, and the riding comfort of the vehicle can be improved.

In addition, in this configuration, the passages which are closed by the first leaf valve 41 are formed individually, and the piston speed at which each passage opens upon application of the initial load F to the first leaf valve 41 is different. Therefore, by opening the first communication passage 3a on the outer peripheral edge side of the first leaf valve 41 earlier, the region of the damping force characteristics which serve as the valve characteristics can be expanded to the low-speed side. As a result, the region of the orifice characteristics becomes smaller, and thus the damping coefficient of the orifice characteristics can be increased and the damping force in the extremely low speed region can be increased.

The piston 3 further includes the support parts 3*i* which are provided between the second seat part 3*g* and the abutting part 3*e* and support the first leaf valve 41.

If the position at which the initial load F is applied to the first leaf valve 41 is more toward the inside in the radial direction than the second seat part 3*g*, the first leaf valve 41 deforms to the piston 3 side, and the outer peripheral edge of the first leaf valve 41 may float up from the first seat part 3*f*. In this configuration, the support parts 3*i* are provided to the piston 3 between the second seat part 3*g* and the abutting part 3*e*. The first leaf valve 41 is supported by the support parts 3*i*, and thus even if the initial load F is applied, the first leaf valve 41 is prevented from deforming to the piston 3 side. As a result, the outer peripheral edge of the first leaf valve 41 is prevented from floating up from the first seat part 3*f*, and thus the desired damping force characteristics can be obtained.

The initial load F is applied to the first leaf valve 41 within a range between the inside in the radial direction from the first seat part 3*f*, which is positioned on the outside in the radial direction of the first communication passage 3*a*, and the outside in the radial direction from the support parts 3*i*.

Due to this configuration, the first leaf valve 41 is supported by the support parts 3*i* so that the first leaf valve 41 is prevented from deforming to the piston 3 side, and the damping force characteristics can be arbitrarily modified from the low-speed region to the high-speed region by changing the position at which the initial load F is applied to the first leaf valve 41.

The load application member 42 includes the following: the annular second leaf valve 43; and the annular transmission plate 44 that is sandwiched between the first leaf valve 41 and the second leaf valve 43. The transmission plate 44 has the protrusion 44*a* that protrudes in the axial direction and abuts the first leaf valve 41 or the second leaf valve 43.

Due to this configuration, the initial load F is applied to the first leaf valve 41 from the second leaf valve 43 via the transmission plate 44. Therefore, the position at which the initial load F is applied to the first leaf valve 41 and the magnitude of the initial load F can be easily changed by modifying the outer diameter of the transmission plate 44, the protrusion amount of the protrusion 44*a*, the rigidity of the second leaf valve 43, and the like. As a result, the desired damping force characteristics can be easily realized.

Embodiments of this invention were described above, but the above embodiments are merely examples of applications of this invention, and the technical scope of this invention is not limited to the specific constitutions of the above embodiments.

For example, in the above-described embodiment, hydraulic oil is used as the working fluid, but another liquid such as water or the like may be used.

The load application member 42 is not limited to using the repulsive force of the second leaf valve 43, and may use the elastic force of a coil spring, etc. supported at one end by the nut 11, etc.

The valve structure is not limited to being constituted by the piston 3 and the damping valve 40 of the twin-tube type shock absorber, and the valve structure may be constituted by the base valve 8 and the damping valve 10 of the twin-tube type shock absorber. Further, the valve structure may be used in a mono-tube type shock absorber to apply resistance to hydraulic oil flowing from the contraction-side chamber to the extension-side chamber or to apply resistance to hydraulic oil flowing from the extension-side chamber to the contraction-side chamber.

The surface at which the first seat part 3*f*, the second seat part 3*g*, the support parts 3*i*, and the abutting part 3*e* provided to the piston 3 contact the first leaf valve 41 may be formed so as to be inclined to become higher toward the outer peripheral edge of the first leaf valve 41. In this case, it becomes easier for the first leaf valve 41 to contact the seat parts, and the sealing performance can be improved.

The passages that are opened/closed by the first leaf valve 41 are not limited to the first communication passage 3*a* and the second communication passage 3*b*, and three or more passages can be formed aligned in the radial direction. For example, an independent passage may be further provided on the inside in the radial direction from the second communication passage 3*b*.

In order to change the damping characteristics, instead of modifying the magnitude and position of the initial load F, the rigidity of the first leaf valve 41, the second leaf valve 43, and the transmission plate 44 may be appropriately modified.

This application claims priority based on Japanese Patent Application No. 2015-157518 filed with the Japan Patent Office on Aug. 7, 2015, the entire contents of which are incorporated into this specification.

The invention claimed is:

1. A valve structure of a shock absorber, comprising:
a valve disc provided within a cylinder and configured to partition a first pressure chamber and a second pressure chamber;
a first communication passage provided to the valve disc and configured to allow communication between the first pressure chamber and the second pressure chamber;
a second communication passage provided to the valve disc on an inside in an radial direction from the first communication passage, the second communication passage being configured to allow communication between the first pressure chamber and the second pressure chamber;
a first seat part provided around the periphery of an opening edge of the first communication passage on the first pressure chamber side;
a second seat part provided around the periphery of an opening edge of the second communication passage on the first pressure chamber side;
an annular first plate valve configured to abut the first seat part and the second seat part; and
a load application member configured to apply an initial load that pushes the first plate valve to the first seat part and the second seat part, wherein
the valve disc includes an abutting part to which an inner peripheral edge of the first plate valve abuts, and a support part extending radially inward from the second seat part toward the abutting part and supporting the first plate valve, and
an area in which the initial load is applied to the first plate valve is set to an area at a radially inner side of the first seat part that is positioned radially outward of the first communication passage and at a radially outer side of a region in which the support part is provided, the area including the region in which the support part is provided.

2. The valve structure of the shock absorber according to claim 1,
wherein the load application member includes an annular transmission plate with a protrusion, the protrusion protruding in an axial direction to abut the first plate valve, and
wherein the initial load is applied to the first plate valve at a position where the protrusion abuts the first plate valve.

3. The valve structure of the shock absorber according to claim 2, wherein the protrusion is formed on an outer peripheral edge of the transmission plate.

4. The valve structure of the shock absorber according to claim 2, wherein the protrusion is formed as a ring-shaped member that is separated from the transmission plate.

5. The valve structure of the shock absorber according to claim 1,
wherein the load application member includes:
an annular second plate valve; and
an annular transmission plate sandwiched between the first plate valve and the second plate valve, the annular transmission plate having a protrusion to abut the second plate valve, and
wherein the initial load is applied to the first plate valve at a position where the protrusion abuts the second plate valve.

6. The valve structure of the shock absorber according to claim 1, wherein
the first communication passage and the second communication passage are each constituted by a plurality of passages,
the first seat part is provided for each passage of the first communication passage, and
the second seat part is annularly formed to surround all of the passages of the second communication passage.

7. The valve structure of the shock absorber according to claim 1, wherein the first seat part has a portion extending inward in the radial direction, said portion and the support part being continuously formed in the radial direction.

8. The valve structure of the shock absorber according to claim 1, wherein the support part and the second seat part are integrally formed.

9. The valve structure of the shock absorber according to claim 1, wherein the initial load is applied at a predetermined position of the first plate valve, the predetermined position being set within an area including, in a radial direction of the first plate valve, from an outermost end of the first seat part to an innermost end of the support part, depending on a magnitude of the initial load.

10. The valve structure of the shock absorber according to claim 1, wherein the initial load is applied at a predetermined position of the first plate valve, the predetermined position being set within an area including, in a radial direction of the first plate valve, from an outermost end of the first seat part to an innermost end of the support part, such that the more outward the predetermined position is set, the greater the damping force is generated.

* * * * *